US012809855B2

(12) United States Patent
McNair et al.

(10) Patent No.: US 12,809,855 B2
(45) Date of Patent: Nov. 24, 2026

(54) WEB3 ASSET RECORDAL WITH TRANSPARENCY AND ERROR RECOVERY

(71) Applicant: SAP SE, Walldorf (DE)

(72) Inventors: Keyoni McNair, Redwood City, CA (US); Rohit Mukund Deshpande, Fremont, CA (US); Narek Asadorian, Los Angeles, CA (US); Michael Roth, Philadelphia, PA (US); Scott Young, Palo Alto, CA (US)

(73) Assignee: SAP SE, Walldorf (DE)

( * ) Notice: Subject to any disclaimer, the term of this patent is extended or adjusted under 35 U.S.C. 154(b) by 42 days.

(21) Appl. No.: 18/935,879

(22) Filed: Nov. 4, 2024

(65) Prior Publication Data

US 2026/0127161 A1 May 7, 2026

(51) Int. Cl.
*G06F 16/23* (2019.01)
*G06F 21/60* (2013.01)
*G06Q 40/06* (2012.01)

(52) U.S. Cl.
CPC ........ *G06F 16/2379* (2019.01); *G06F 21/602* (2013.01); *G06Q 40/06* (2013.01)

(58) Field of Classification Search
CPC .... G06F 16/2379; G06F 21/602; G06Q 40/06
See application file for complete search history.

(56) References Cited

U.S. PATENT DOCUMENTS

| | | | | |
|---|---|---|---|---|
| 11,044,098 B1 * | 6/2021 | Thacker | ................ | H04L 9/3247 |
| 11,971,881 B1 * | 4/2024 | Surendran | ........... | G06F 16/2379 |
| 2020/0159697 A1 * | 5/2020 | Wood | .................... | G06F 16/162 |
| 2024/0311902 A1 * | 9/2024 | Levine | ............... | G06Q 30/0643 |
| 2024/0396752 A1 * | 11/2024 | Khan | .................... | H04L 9/3239 |
| 2025/0069070 A1 * | 2/2025 | Ravinathan | ............ | G06Q 20/12 |
| 2026/0099839 A1 * | 4/2026 | Sukur | .................. | G06Q 20/382 |

* cited by examiner

*Primary Examiner* — Charles Rones
*Assistant Examiner* — Mohammad S Bhuyan
(74) *Attorney, Agent, or Firm* — Buckley, Maschoff & Talwalkar LLC

(57) ABSTRACT

Systems include reception of metadata of a Web3 asset at a Web interface, storage of the metadata in a database in association with a tenant identifier, transmission of one or more instructions to execute a process to record the Web3 asset to a distributed ledger, updating, during execution of the process, of a current state of the process in a record of the database associated with the tenant identifier, determination of an error associated with execution of the process, determination of an error notification comprising a retry option based on the current state of the process in the record, reception of a selection of the retry option, and, in response to receipt of the selection, resume execution of the process at a state immediately prior to the current state of the process in the record.

20 Claims, 9 Drawing Sheets

WEB3 ASSET RECORDAL WITH TRANSPARENCY AND ERROR RECOVERY

BACKGROUND

A non-fungible token (NFT) is a digital "Web3" asset that represents ownership of a digital or real-world item. NFTs are unique cryptographic tokens that cannot be replicated. NFTs exist on a blockchain and are similar to a certificate of authenticity that is issued by a creator of the NFT. The blockchain records the ownership of an NFT and allows the ownership to be transferred from one party to another party.

Widespread use of NFTs is limited by the technical expertise required to create, manage and interact with NFTs. A typical user is not technically capable of manually generating the transactions required to record (or "mint") NFTs on a blockchain. Moreover, all NFT creators grapple with a lack of transparency during the minting process. For example, existing systems provide limited, non-descriptive status information to a creator as minting progresses. This lack of actionable information can lead to confusion, uncertainty, and inefficient decision-making.

Minting involves asynchronous calls to the blockchain and to the InterPlanetary File System (IPFS), which are inherently prone to failure due to network issues, congestion, or other unforeseen factors. Current systems lack a robust error-handling mechanism for dealing with such failures. When an error occurs during minting of an NFT, particularly during asynchronous calls to the blockchain or to the IPFS, creators are often unaware of the issue which caused the error and can therefore do little to remedy the issue. Current systems therefore risk incomplete or failed minting processes, complicating a creator's efforts to launch an NFT collection.

With respect to such failed processes, current systems also fail to specify a point of failure. Because the point of failure is unknown, a failed minting process must necessarily be restarted from the beginning rather than from the point of failure. The minting process can be inefficient, time-consuming and resource-intensive as a result, negatively impacting the overall user experience.

It is therefore desirable to provide semantically-useful status information to a creator during a minting process. It is also desirable to provide a robust error-handling and retry mechanism for dealing with failures. Both of the desires are hindered by the asynchronous nature of the NFT minting process.

DETAILED DESCRIPTION

The following description is provided to enable any person in the art to make and use the described embodiments. Various modifications, however, will be readily-apparent to those in the art.

Embodiments may address the foregoing issues through the implementation of a feedback mechanism and a retry mechanism which enhance the efficiency of the NFT minting process. Advantageously, a user is notified of progress through various stages of the minting process. In response to an error, embodiments are capable of identifying the point of failure, providing a user with a useful description of the failure, and resuming processing from the point of failure. Embodiments may therefore reduce the need to re-initiate an entire minting process in response to a failure.

Embodiments introduce a granular and descriptive state machine representing the NFT collection minting process. The states assist in pinpointing a stage of the minting process at which an error occurs, thereby enabling a clearer understanding of the minting process and facilitating efficient error recovery. The states include, for example, Create Collection Wallet, Deploy Smart Contract, Upload Contract Metadata, Set Contract Metadata, Minting, and Published Each state may be assigned a status indicating whether it has not started, started, completed, or has encountered an error.

Figure 1:
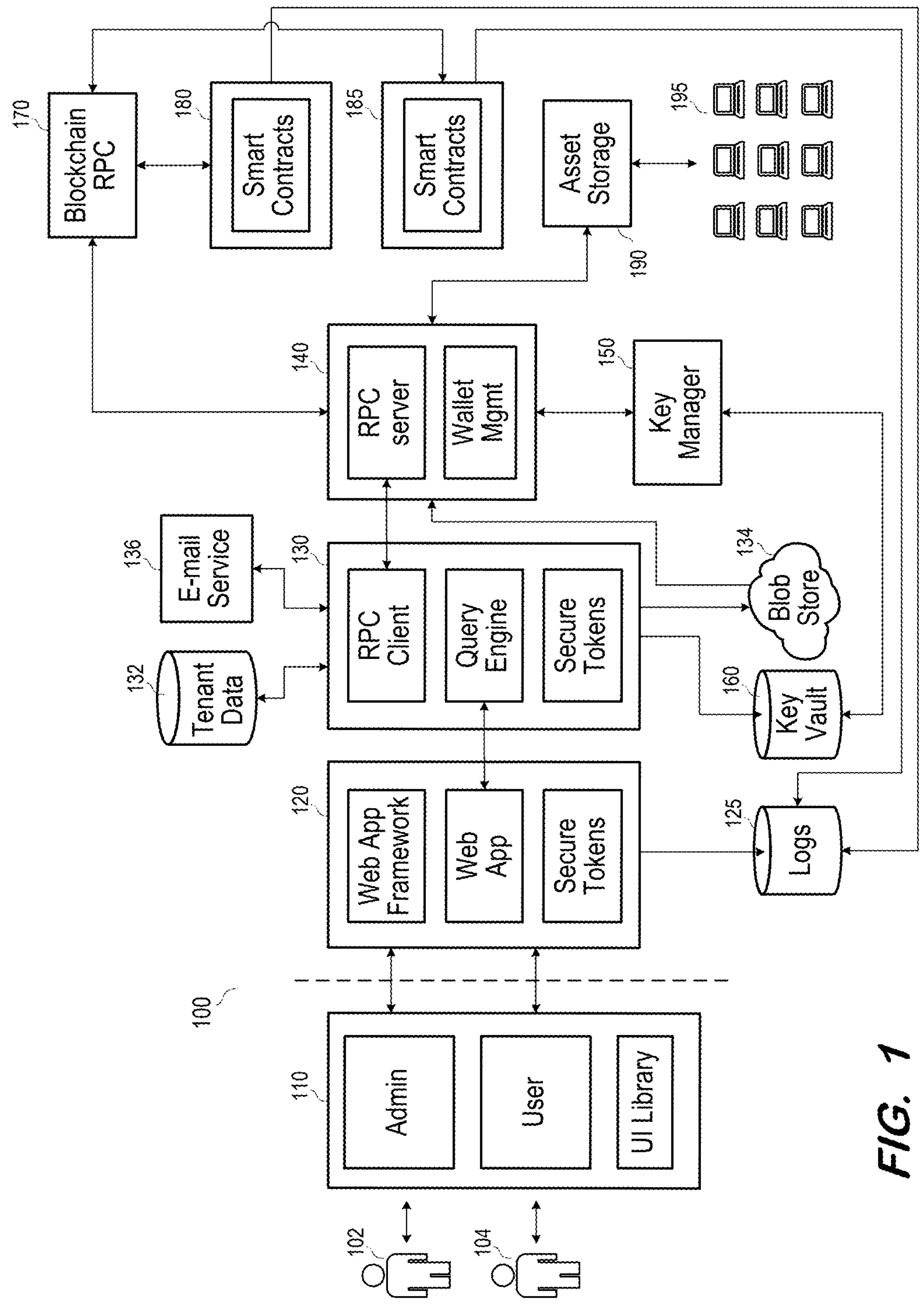
FIG. 1 is a block diagram of a system to initiate and manage minting of NFTs using Web2 technology according to some embodiments.

FIG. 1 is a block diagram illustrating system 100 to initiate and manage minting of NFTs using Web2 technology according to some embodiments. Each of the illustrated components may be implemented using any suitable combination of computing hardware and/or software that is or becomes known. In some embodiments, two or more components are implemented by a single computing device. Two or more components of system 100 may be co-located. One or more components may be implemented as a cloud service (e.g., Software-as-a-Service, Platform-as-a-Service). A cloud-based implementation of any components of system 100 may apportion computing resources elastically according to demand, need, price, and/or any other metric.

Each component may comprise, for example, comprise a single computer server, a virtual machine, or a cluster of computer servers such as a Kubernetes cluster. Kubernetes is an open-source system for automating deployment, scaling and management of containerized applications. Each component of system 100 may therefore be implemented by one or more servers (real and/or virtual) or containers. Each data storage component depicted herein may comprise one or more storage systems, each of which may be standalone or distributed, on-premise or cloud-based.

System 100 includes client 110 may comprise a single page application executing on a user device and using a UI library such as React, for example. The single page application may support an administrator experience for administrator 102 and a user experience for user 104. The user device may include a Web browser compatible with Web2 protocols. In one example, client 110 may interact with a Web application of client server 120 built on a Web application framework such as Next.js. Client server 120 communicates with API layer 130 via an API query language such as GraphQL and leverages secure tokens (e.g., Web tokens) for user authentication, user authorization, and multi-tenancy.

Client 110, client server 120 and tenant data 132 generally conform to the frontend, backend, and database paradigm of a Web2 architecture. The frontend enables user requests and receives data from the backend. The backend includes a centralized server that receives requests from the frontend, fetches data from the database, and returns the response to the frontend to be displayed. All of the data is stored in the database, which is also a centralized entity.

API layer 130 supports the traditional Web2 architecture of client 110, client server 120 and tenant data 132, while also passing through and synchronizing with Web3 data through Web3 interface server 140. API layer 130 may comprise a traditional Software-as-a-Service application providing user and account management, Web2 data models and data storage, and multitenancy support. API layer 130 allows access through secure tokens (e.g., PASETO tokens, JSON Web Tokens), saves transactional data into tenant data 132 and blob store 134, sends outgoing e-mails via e-mail service 136 (e.g., SendGrid) and executes an RPC (e.g., gRPC) client to communicate with Web3 interface server 140. The secure tokens store information regarding the user, the tenant, and the user's role. All queries may be authenticated and authorized using the token information rather than API arguments.

Web3 interface server 140 is a stateless service that handles interactions with blockchains 180 and 185. For example, Web3 interface server 140 may transmit signed transactions to blockchains 180 and 185. The transactions may, for example, create a Web3 asset (e.g., an NFT), transfer a Web3 asset, create a smart contract, and interact with a smart contract. In the latter regard, Web3 interface server 140 provides transactions needed to execute the functionality of the created smart contracts so that API layer 130 can call that functionality via Web3 interface server 140.

Web3 interface server 140 may communicate with blockchains 180 and 185 via blockchain RPC 170. Embodiments are not limited to two blockchains. According to Web3 architecture, each block on a blockchain is composed of transactions.

Blockchain RPC 170 may be provided by a 3rd party (e.g., Alchemy) but embodiments are not limited thereto. Web3 interface server 140 may comprise a Rust server which communicates with API layer 130 through gRPC, where Protocol Buffers define the API contracts between Web3 interface server 140 and API layer 130.

Web3 interface server 140 communicates with asset storage layer 190 to store metadata and data of NFTs in decentralized storage 195. Decentralized storage may comprise IPFS, and layer 190 may comprise web3.storage in some embodiments.

Web3 interface server 140 provides management of tenant (i.e., custodial tenant) and user wallets. The wallet management component of Web3 interface server 140 includes wallet creation, funds transfer, and other functionalities. The wallet management component also includes orchestration of blockchain transaction signing using a private key associated with a wallet. Key manager 150 may implement a remote signing utility which is called by Web3 interface server 140 to request such signing. Key manager 150 may in turn request signing of a transaction using a private key stored in key vault 160. Key manager 150 may comprise a trusted open-source key management solution such as Consensys Quorum Key Manager but embodiments are not limited thereto.

Before a transaction can be included in a block, it must be executed by a virtual machine associated with the blockchain, such as the Ethereum Virtual Machine (EVM). The EVM runs on top of the blockchain to execute transactions between users and smart contracts and compute the new state resulting from those interactions. The newly-computed state becomes the base for a new block.

Smart contracts are programs that contain logic written in specifically-purposed languages. The code and variables of a smart contract are deployed and stored on the blockchain. A smart contract deployed to the blockchain is uniquely identified and accessed by its address. An address can identify a smart contract or an externally-owned account. Externally-owned accounts are controlled by users and smart contracts are controlled by code, although both can hold balances and interact with smart contracts.

A clone factory contract (e.g., EIP-1167) for each smart contract to be used may be deployed on blockchains 180 and 185. A clone factory contract is called by Web3 interface server 140 to clone new smart contracts on its blockchain. The clone factory contracts may leverage open-source libraries (e.g., OpenZeppelin) and may comprise Solidity smart contracts in the case of the Ethereum blockchain.

In some embodiments, client server 120, API layer 130 and Web3 interface server 140 are deployed as Docker containers using Kubernetes. Client server 120, API layer 130 and Web3 interface server 140, as well as key manager 150, may be deployed in the same on-premise backend.

Administrator 102 or user 104 may operate client 110 to provide authentication credentials (e.g., username and password) to client server 120. Client server 120 executes its Web application to perform an authentication process based on the credentials, receive requests from client 110, and instructs API layer 130 to read from and write to tenant data 132 in response to the requests and based on data authorizations granted to administrator 102 or user 104. The Web application may provide any functionality that is or becomes known, including but not limited to enterprise resource planning functionalities.

According to some embodiments, client 110 interacts with client server 120 using interfaces presented on a Web client of a user device to initiate minting of an NFT. Administrator 102 may create metadata describing the NFT and also specify the name and attributes of the NFT and an image file associated with the NFT. Client server 120 may instruct API server 130 to store the metadata and data of the NFT in association with an identifier of the NFT and a tenant identifier in tenant data 132.

Administrator 102 may use client 110 to specify e-mail addresses of users to whom an NFT should be distributed. Accordingly, e-mail service 136 may transmit e-mails distributing the NFT to the users and tenant data 132 may also store a list of e-mail addresses to which the NFT was distributed. User 104 may receive such an e-mail via their e-mail client application and access client server 120 using a link provided in the e-mail. The user then interacts with client server 120 using interfaces presented by client 110 to claim the NFT. As a result, an identifier of the user is stored in tenant data 132 in association with the identifier of the NFT to indicate that the user "owns" the NFT.

Blob store 134 may be cloud-based and may provide storage at a lower cost than comparable file-based storage systems. API layer 130 may store unstructured data such as NFT images in blob store 134. Accordingly, if a user requests to view the data and metadata of an NFT which they own, API layer 130 may retrieve the corresponding metadata and data from tenant data 132 and the image from blob store 134 for presentation to the user without accessing Web3 storage. Accesses to tenant data 132 and blob store 134 using Web2 protocols are typically much faster and reliable than accesses to Web3 storage due in part to the asynchronous nature of Web3 protocols.

API layer 130 may request generation of a cryptographic keypair (e.g., a public key and a private key) from key vault 160. Key vault 160 generates the keypair, stores the keypair and returns an identifier of the keypair (e.g., a wallet identifier) to API layer 130. In this regard, a wallet as described herein is a cryptographic keypair and a wallet identifier is an identifier of the keypair. A wallet identifier may comprise the public key of a keypair in some embodiments. API layer 130 may store the wallet identifier in tenant data 132.

The request to generate a keypair may be issued in response to a request received by client server 120 to create a tenant. A tenant may represent a customer organization, and employees of the organization may be considered users of the tenant. Accordingly, client server 120 may store the returned identifier of the keypair in association with an identifier of the tenant. In some embodiments, an application executed by client server 120 may comprise a multi-tenant application, in which case API layer 130 may request generation of a respective keypair for each of several tenants and store a returned identifier of each generated keypair in association with an identifier of its respective tenant in tenant data 132.

Key vault 160 may be provided by an entity different from another one or more entities operating the other components of system 100. Advantageously, the other entities are unable to access the private keys of the keypairs generated by key vault 160. Rather, key vault 160 may only be requested to sign a transaction on behalf of a tenant using its private key and to provide the signed transaction in return.

For example, API layer 130 generates an RPC call specifying a database operation (e.g., a transaction) and transmits the RPC call and a custodial tenant identifier identifying a cryptographic keypair to Web3 interface 140. Web3 interface 140 provides the transaction and the identifier to key manager 150. Key manager 150 then requests key vault 160 to encrypt (i.e., sign) the transaction using the private key associated with the identifier.

Key vault 160 encrypts the transaction with a private key associated with the identifier (e.g., using the secp256k1 elliptic curve scheme and the ECDSA signing algorithm), and returns the thusly-signed transaction to key manager 150. Web3 interface 140 submits the signed transaction to blockchain 168 by executing a predetermined JSON RPC call which corresponds to the RPC call received from client server 120. Key manager 150 may transform the transaction prior to providing the transaction to key vault 160 so that the resulting signed transaction received from key vault 160 conforms to a format acceptable to blockchain 180.

According to some embodiments, the signed transaction generated by Web3 interface 140 may comprise a transaction to create a collection on a blockchain, to create an NFT of a collection on the blockchain, to transfer an NFT from one digital wallet to another digital wallet, to add attribute values to an NFT, etc. For example, Web3 interface 140 receives metadata (describing, among other things, the attributes of the NFT) and data of an administrator-defined NFT from client server 120 and generates and transmits a signed blockchain transaction to blockchain 170 to mint the NFT on blockchain 170. Moreover, Web3 interface 140 executes Web3 protocols to transmit the metadata and data to decentralized storage 190. Web3 interface 140 may also operate per instructions from client server 120 to generate and transmit signed blockchain transactions to blockchain 170 to transfer ownership of an NFT from a tenant wallet to a user wallet.

Figure 2A:
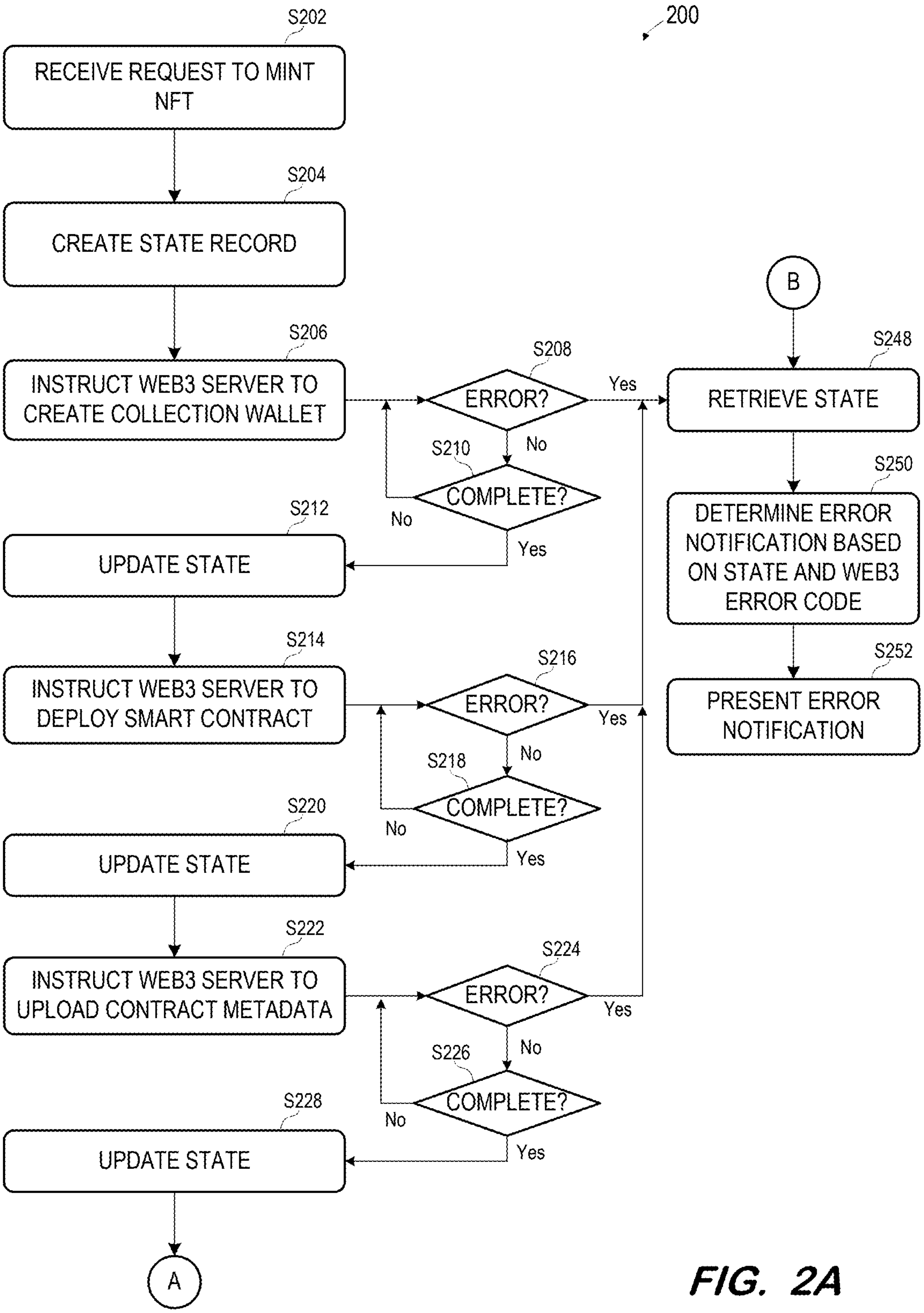
FIGS. 2A and 2B are a flow diagram of a process to mint an NFT according to some embodiments.
Figure 2B:
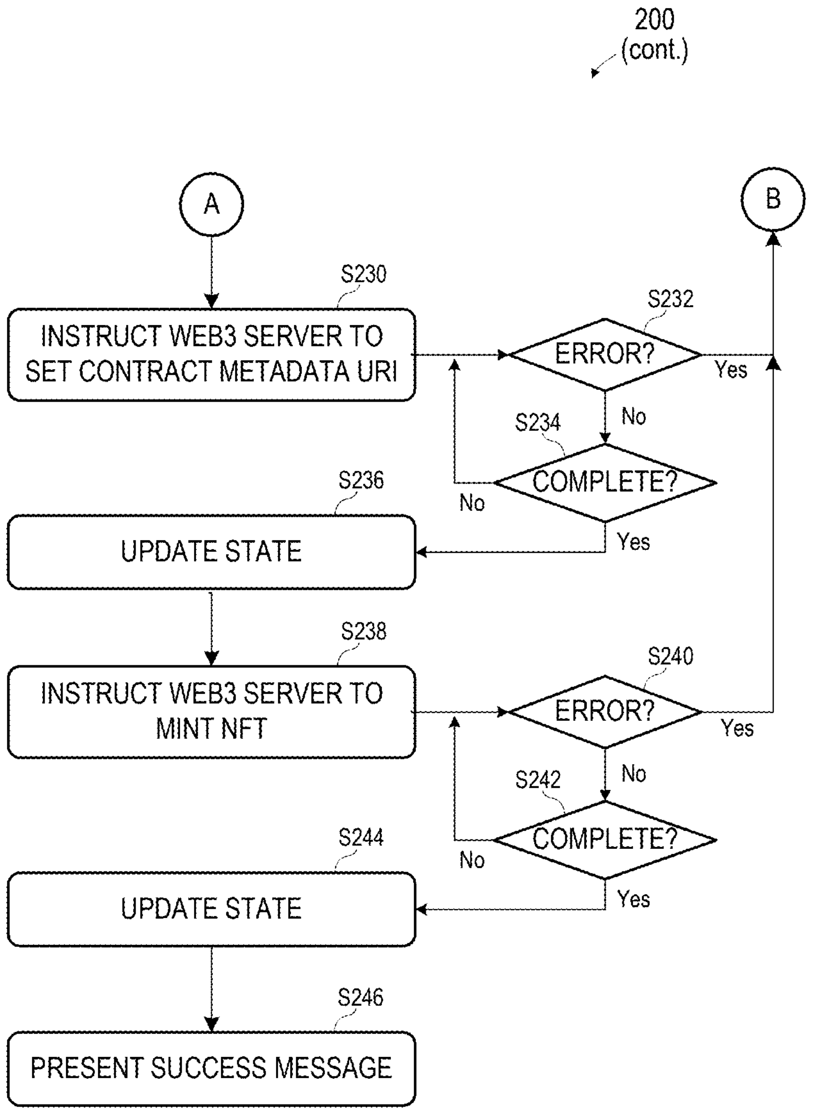

FIGS. 2A and 2B comprise a flow diagram of process 200 to mint an NFT according to some embodiments. Process 200 and the other processes described herein may be performed using any suitable combination of hardware and software. Software program code embodying these processes may be stored by any non-transitory tangible medium, including a fixed disk, a volatile or non-volatile random-access memory, a DVD, a Flash drive, or a magnetic tape, and executed by any one or more processing units, including but not limited to a microprocessor, a microprocessor core, and a microprocessor thread. Embodiments are not limited to the examples described below.

Initially, at S202, a request is to mint an NFT is received. The request may be received, for example, by a Web2 server such as client server 120 from client 110. According to some examples, an administrator operates a Web browser of a user device to access a Uniform Resource Locator associated with a Web application executed by client server 120 and to subsequently interact with the application to request minting of an NFT. Assuming the administrator is authenticated to the Web application and authorized to mint an NFT, a user interface for defining an NFT is presented.

Figure 3:
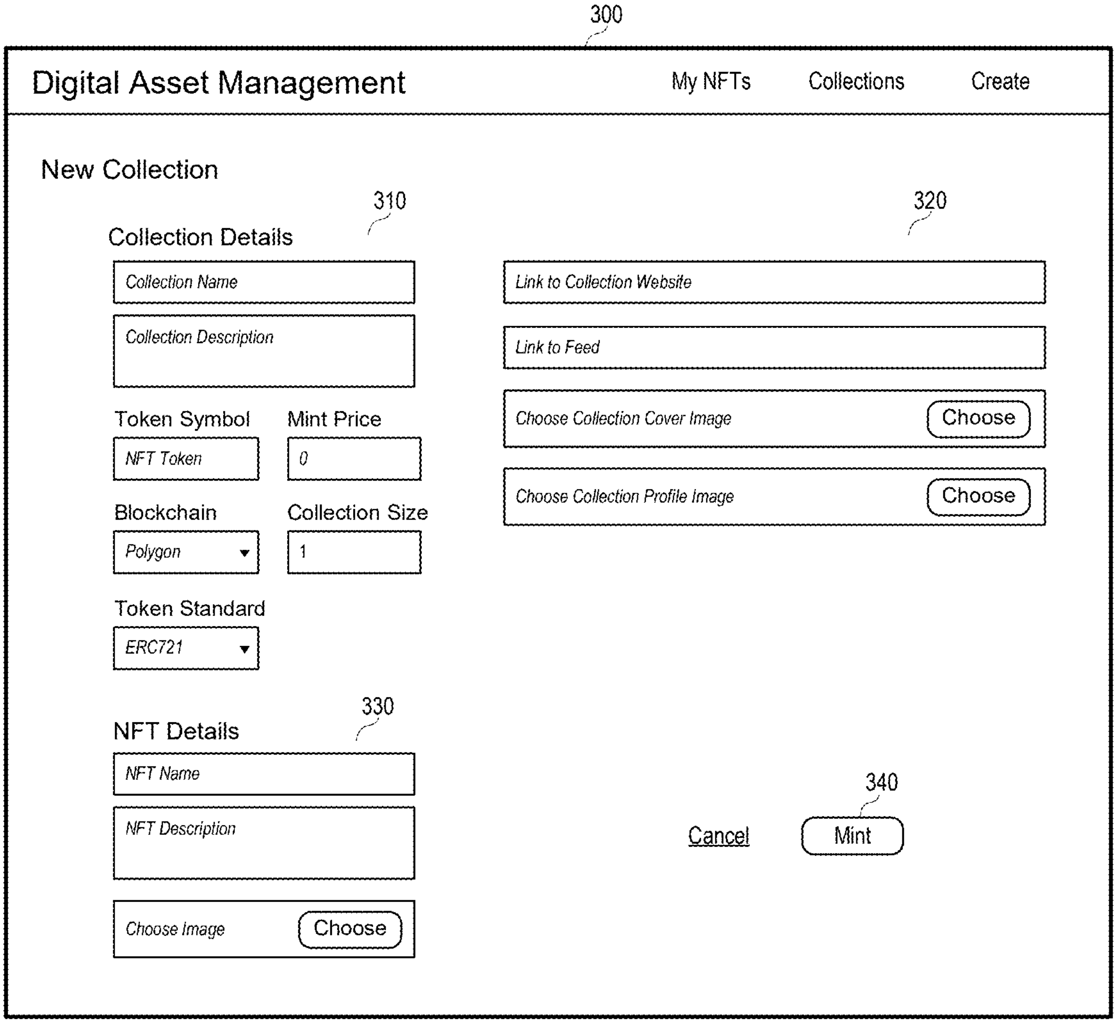
FIG. 3 is a user interface for specifying metadata of an NFT according to some embodiments.

FIG. 3 illustrates interface 300 of a Web2 application to receive metadata and data describing a collection of NFTs according to some embodiments. The present example describes the creation of NFTs within collections. Embodiments are not limited to this paradigm. Rather, an administrator may create an NFT independent of any collection if allowed by the blockchain on which the NFT is to be created.

Collection details input area 310 of interface 300 allows an administrator to provide metadata of a collection of NFTs to be created, including descriptive information and technical details (e.g., blockchain, Token standard, number of NFTs in the collection) to which the collection is to conform. Input area 320 accepts hyperlinks and image data associated with the collection. NFT details input area 330 includes fields for providing a name and a description of an NFT of the collection and data (i.e., image data) associated with the NFT. Interface 300 also includes control 340, which may be selected to save the metadata of the specified NFT collection in association with a tenant identifier in tenant data 132 and the data in blob store 134.

Selection of control 340 may also issue a request to initiate minting of the specified NFT collection. The request is received at S202. Next, at S204, a record is created which associates the NFT with a state. For example, in response to selection of control 340, client server 120 may instruct API layer 130 to create a record within tenant data 132 which associates an identifier of the specified collection with the state Create Collection Wallet and the status "not started". The record may include other information (e.g., tenant and administrator identifiers) according to some embodiments. In some embodiments, the record also associates each other potential state with the status "not started".

At S206, a Web3 interface server is instructed to create a wallet corresponding to the collection using known blockchain transactions. Creation of this wallet comprises creation of a keypair which is associated with a limited set of administrative capabilities on the NFT collection contract and which is not associated with any funds. This keypair is referred to herein as a collection keypair. The collection creator may use the key material of the collection keypair to log onto public platforms such as OpenSea and to edit off-chain metadata (e.g., links, images, text).

In some embodiments, and for each instruction described herein, API layer 130 generates a HyperText Transfer Protocol (HTTP) RPC call which specifies one or more transactions and includes a tenant wallet identifier. The call is transmitted to Web3 interface server 140, which transmits a request to key manager 150 to sign (i.e., encrypt) the transactions using a private key associated with the tenant wallet. Key vault 160 signs the transactions with the private key and returns the signed transactions. The signed transactions are then transmitted as JSON RPC calls to blockchain RPC 170 at S1440 by, for example, transmitting which correspond to the HTTP RPC calls to a blockchain node. API layer 130 may also update the status of the Create Collection Wallet state to "started" at S206.

While the transactions are being executed, flow proceeds to S208 to determine whether an error has occurred and, if not, to S210 to determine whether creation of the collection wallet (i.e., the collection keypair) is complete. Flow cycles between S208 and S210 until either an error is identified, or the wallet creation is complete. An error is identified at S208 if API layer 130 receives an error code from Web3 interface server 140. Wallet creation is considered to be complete at S210 once API layer 130 receives the public and private keys (i.e., the collection keypair) of the collection wallet from Web3 interface server 140. API layer 130 stores the public and private keys of the collection wallet in tenant database 132.

Assuming the collection wallet is created without error, flow proceeds from S210 to S212 to update the stored record indicating the state of the NFT minting process. For example, the status of the Create Collection Wallet state may be set to "completed". Next, at S214, the Web3 interface server is instructed to deploy a smart contract corresponding to the collection wallet on the blockchain and the status of the Deploy Smart Contract state is set to "started". The instruction comprises one or more signed transactions intended to initiate creation and deployment of the collection's contract on the blockchain. The instruction specifies the wallet address of the tenant, the created collection wallet, and the collection information including the NFT data and metadata.

Figure 4A:
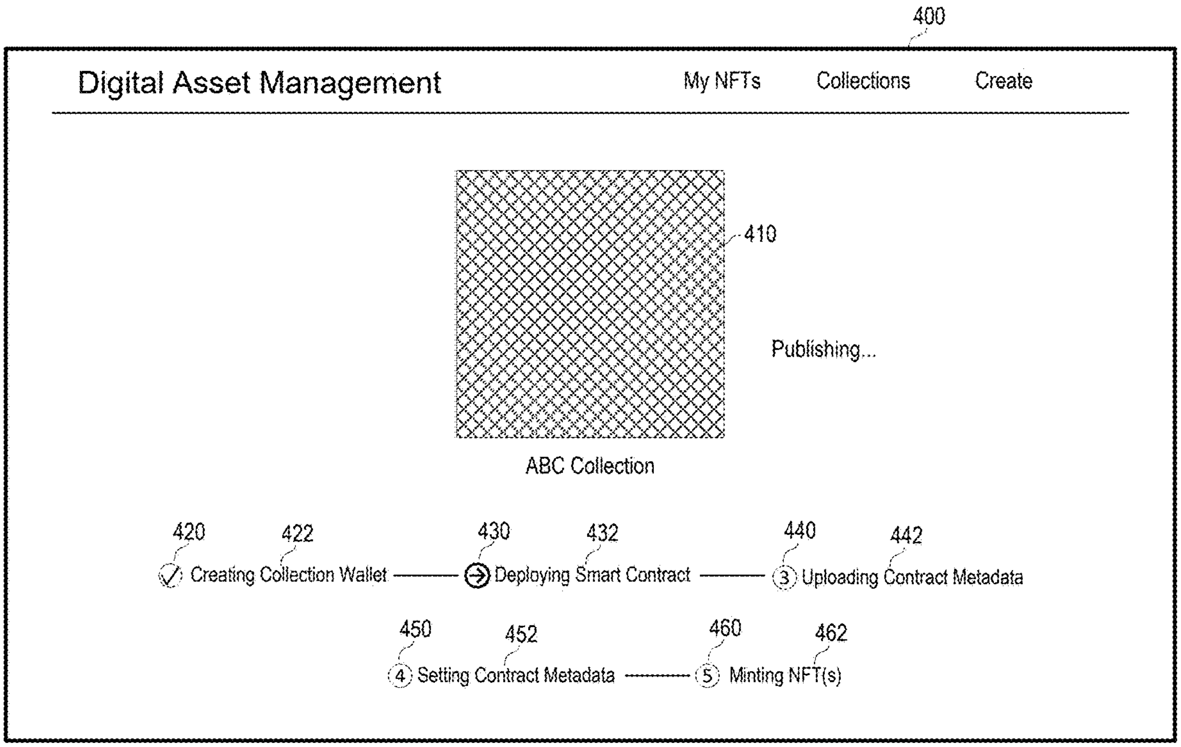
FIGS. 4A-4E show a user interface for tracking an NFT minting process according to some embodiments.

FIG. 4A illustrates interface 400 after the Web3 interface server is instructed at S214 to deploy a smart contract. User interface 400 includes image 410 representing the NFT to be minted and progress indicators 420, 422, 430, 432, 440, 442, 450, 452, 460 and 462. Progress indicators 420 and 422 are associated with the state Create Collection Wallet. Progress indicator 420 indicates that the status of the state Create Collection Wallet is "completed". In contrast, progress indicators 430 and 432 are associated with the state Deploy Smart Contract and progress indicator 430 indicates that the status of the state Deploy Smart Contract is "started". To assist in depicting progress of the smart contract deployment, progress indicator 430 may visually change over time while the status of the state Deploy Smart Contract is "started".

Progress indicators 440 and 442 are associated with the state Upload Contract Metadata, progress indicators 450 and 452 are associated with the state Set Contract Metadata, and progress indicators 460 and 462 are associated with the state Minting. Progress indicators 440, 450 and 460 indicate that the statuses of their associated states are "not started". Embodiments are not limited to the layout, content, or types of progress indicators of interface 400.

Interface 400 of FIG. 4A is displayed while flow cycles between S216 and S218 until either an error is identified, or the smart contract has been deployed. As described above, an error may be identified at S216 if API layer 130 receives an error code from Web3 interface server 140. Deployment of the smart contract is complete once API layer 130 receives the newly-created contract address and a transaction hash. API layer 130 may store the address and hash in tenant database 132.

Again assuming no errors, flow proceeds from S218 to S220 to update the status of the Deploy Smart Contract state to "completed". At S222, the Web3 interface server is instructed to upload contract metadata, and the status of the Upload Contract Metadata state is set to "started". Uploading the contract metadata is the initial phase of the connection to the IPFS. The instruction to upload the contract metadata includes data associated with the collection and an external link to the collection.

Figure 4B:
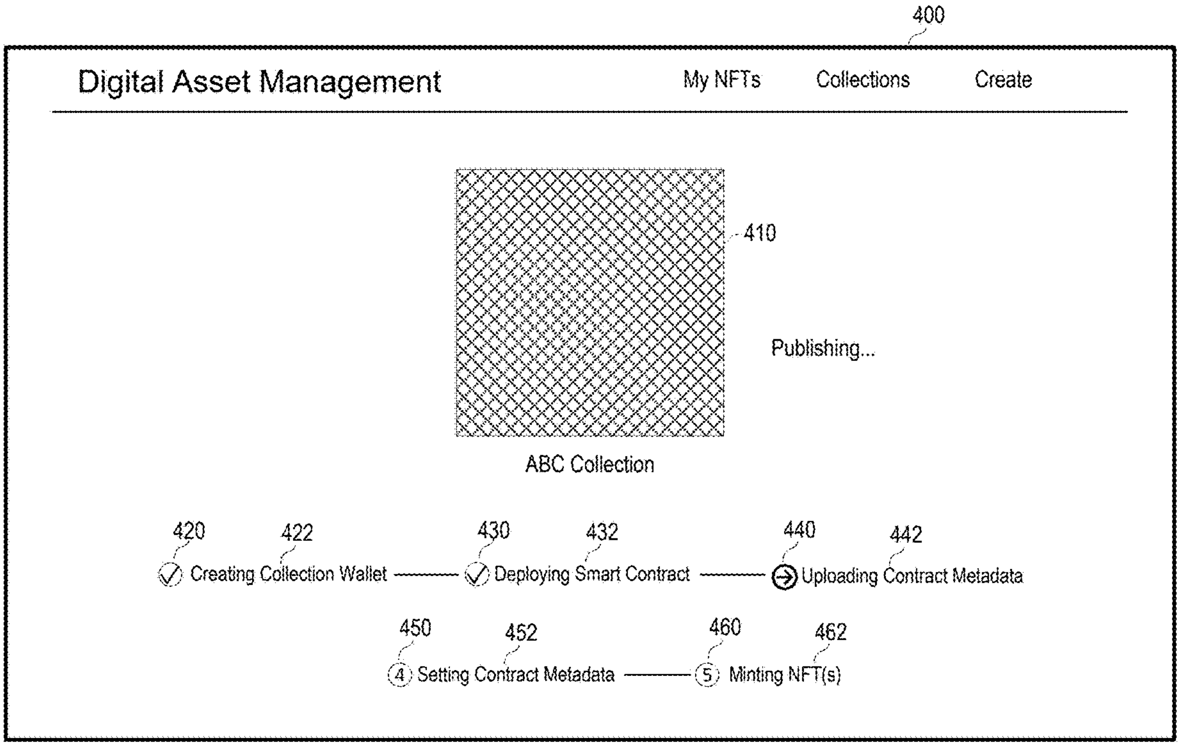

Interface 400 of FIG. 4B is displayed while flow cycles between S224 and S226 until either an error is identified, or the upload is complete. As shown, progress indicator 430 indicates that the status of the state Deploy Smart Contract is "complete" and progress indicator 440 indicates that the status of the state Upload Contract Metadata is "started".

Uploading the contract metadata consists of storing the metadata and the data included in the instruction in the IPFS and returning a Uniform Resource Identifier (URI) usable to access the stored information to API layer 130. The status of the Upload Contract Metadata state is set to "completed" at S228 if it is determined at S226 that the URI to the IPFS has been returned. API layer 130 saves the URI to tenant database 132.

The Web3 interface server is instructed at S230 to set the contract metadata URI. Setting the URI consists of linking the URI to the contract on the blockchain. Linking the URI facilitates accessibility of the collection and the contract data by any parties.

Figure 4C:
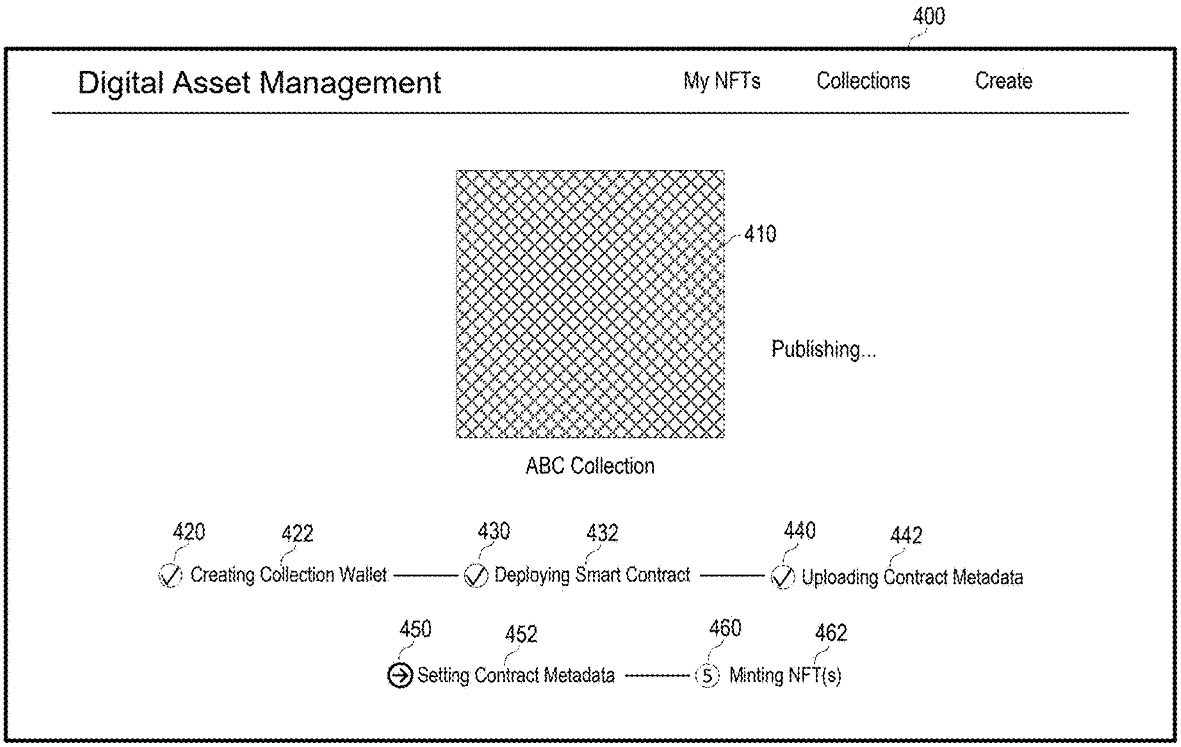

The status of the Set Contract Metadata state is also set to "started" at S230. FIG. 4C shows interface 400 as displayed while flow cycles between S232 and S234. Progress indicator 440 indicates that the status of the Upload Contract Metadata state is "complete" and progress indicator 450 indicates that the status of the state Set Contract Metadata is "started".

Figure 4D:
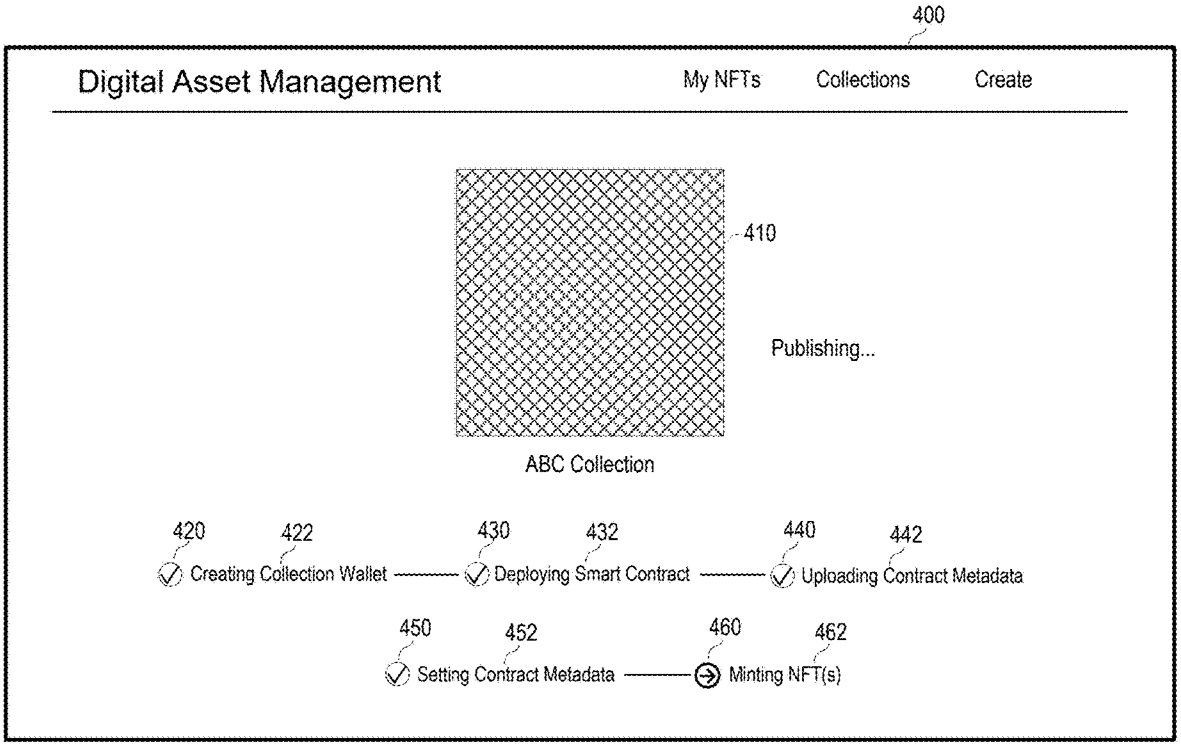

Assuming the URI is successfully linked to the contract on the blockchain, the status of the Set Contract Metadata state is set to "completed" at S236. Next, at S238, the Web3 interface server is instructed to mint the NFT and the status of the Set Contract Metadata state is set to "started". In this regard, interface 400 of FIG. 4D shows progress indicator 450 indicating that the status of the Set Contract Metadata state is "complete" and progress indicator 460 indicating that the status of the Minting state is "started".

As flow cycles between S240 and S242, the NFTs created for the collection are divided into manageable batch sizes. The image location and metadata of each NFT within a batch are uploaded to the IPFS. The IPFS returns corresponding URIs to API layer 130, and layer 130 stores the URIs in association with the collection in database 132. Next, using the URIs, each of the NFTs of a batch is minted onto the blockchain. Tenant database 132 is updated to associate each NFT with a corresponding transaction hash and Token ID.

Figure 4E:
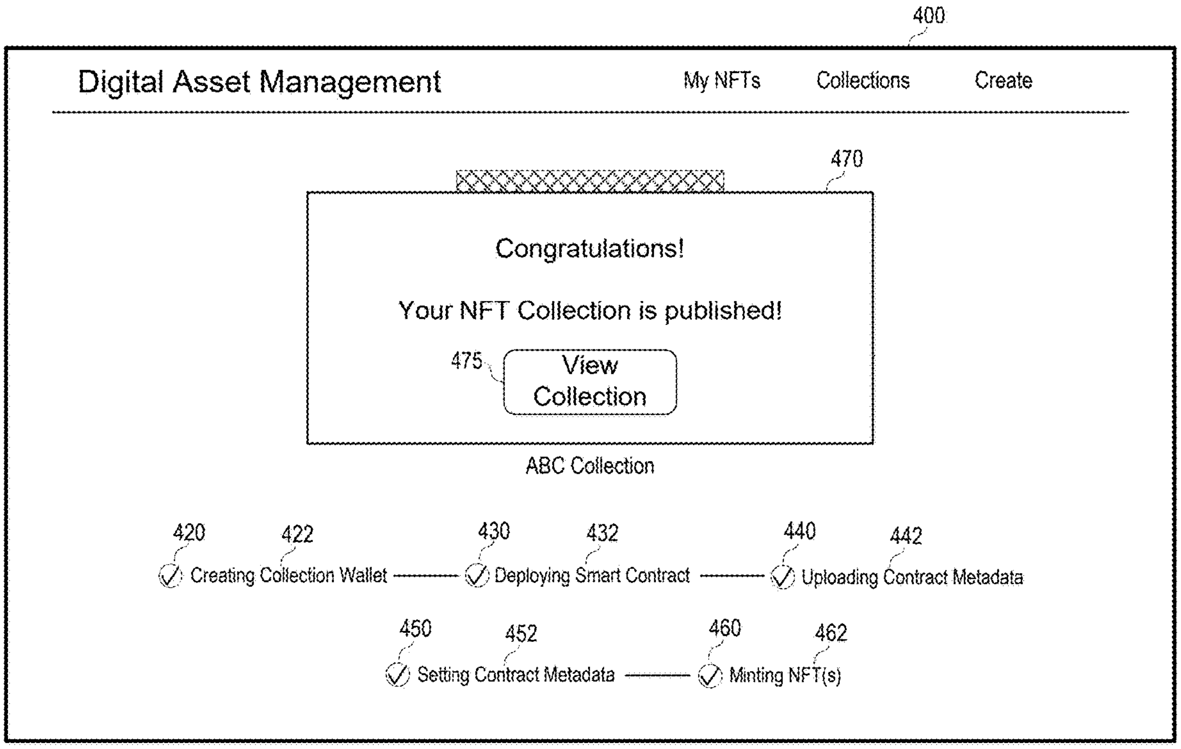

Upon completion, the status of the Minting state is updated to "completed" at S244 and a success message is presented at S246. FIG. 4E shows success message 470 presented at S246 according to some embodiments. Success message 470 includes control 475 which may be selected to retrieve the collection metadata and data from tenant database 132.

The foregoing description assumed no errors during the minting process. However, errors may be detected at S208 during creation of the collection wallet, at S216 during deployment of the smart contract, at S224 during upload of the contact metadata, at S232 during setting of the contract metadata URI, or at S240 during minting of the NFT(s). For example, at any of these steps, API layer 130 may receive a Web3 error code from Web3 interface server 140.

In response to detection of an error (i.e., receipt of a Web3 error code) at any of S208, S216, S224, S232, or S240, a current state of the current minting process is retrieved from the corresponding record of tenant data 132 at S248. A status of the current state may also be set to "error occurred" in the record. Next, at S250, an error notification is determined based on the retrieved state and the Web3 error code. The error notification may include a description of the error, the current state, and/or one or more selectable remedies for addressing the error. API layer 130 may determine the error notification based on logic which considers the current state, the error code, and any other predicates.

Possible error codes and their corresponding remedies [as error_code (remedies)] include but are not limited to ERROR_INSUFFICIENT_FUNDS (Contact Admin), ERROR_IPFS_UPLOAD (Retry or Contact Admin), ERROR_ASSET_DOWNLOAD (Retry or Contact Admin), ERROR_TRANSACTION (Retry or Contact Admin), ERROR_SIGNER (Retry or Contact Admin), ERROR_MISSING_FIELD (Contact Admin), ERROR_INVALID_FIELD (Contact Admin), ERROR_WALLET_FAUCET (Display Full Error), ERROR_SERVICE_CONFIGURATION (Contact Admin), ERROR_GAS_ESTIMATION (Retry or Contact Admin), and ERROR_GAS_CATEGORY (Wait and retry, or Select Higher Gas Category).

The error notification is presented at S252. The presented remedies may include an option to initiate a retry of the current transaction and subsequent transactions. Advantageously, the remedies of the error notification need not include retrying transactions corresponding to states which are prior to the current state, since those transactions can be assumed to have been successfully completed.

In one example, the error code ERROR_INSUFFICIENT_FUNDS may be received at S208. Accordingly, the state Create Collection Wallet having status "started" is retrieved at S248. An error notification is determined at S250 based on the retrieved state and the Web3 error code. For example, since it may be assumed, based on the current state, its status and the error, that the collection wallet has not yet been created, the error notification may include an option to retry creation of the wallet. The error notification is presented at S252. If the administrator selects the option to retry creation of the wallet from the presented notification, process 200 may be re-executed beginning at S206.

In another example, the error code ERROR_GAS_ESTIMATION may be received at S216. The state Deploy Smart Contract having status "started" is retrieved at S248 and the status may be changed to "error occurred". An error notification is determined at S250 based on the retrieved state and the Web3 error code. Since the current state, status and error code indicates the smart contract has not yet been deployed, the error notification may include an option to retry deployment of the smart contract. The error notification is presented at S252.

Figure 5A:
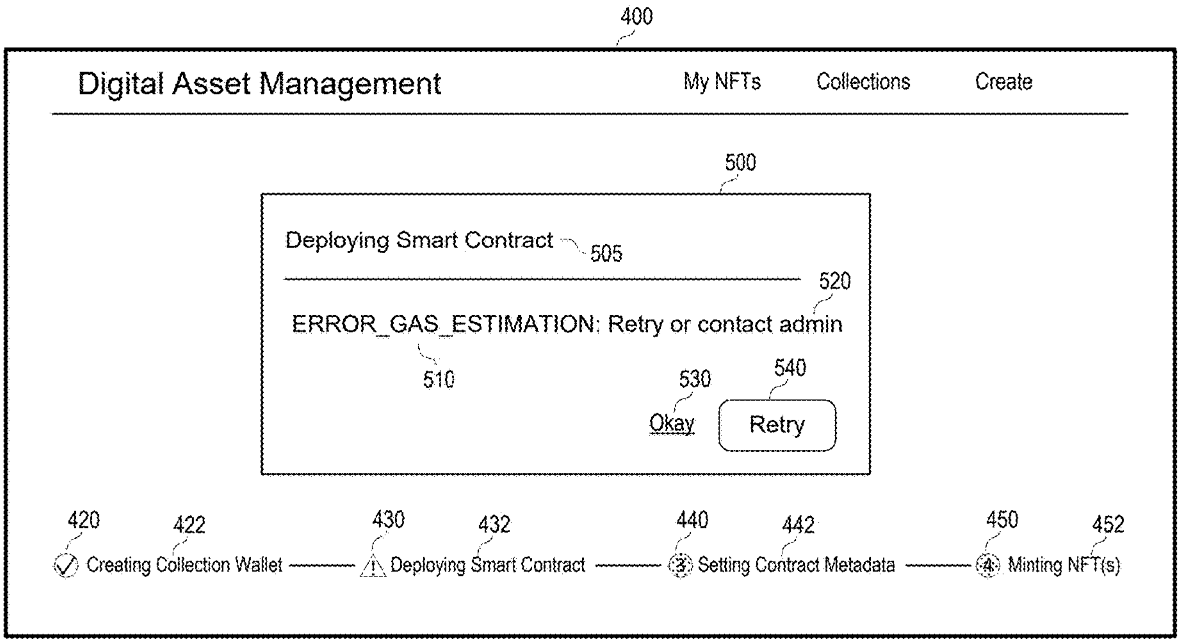
FIGS. 5A-5B shows a user interface for tracking an NFT minting process according to some embodiments.

FIG. 5A shows user interface 400 presenting error notification window 500 at S252 according to some embodiments. Error notification window 500 indicates the current state 505, the returned error code 510, and remedies 520. Progress indicator 430 also indicates the occurrence of an error at the current state. Selection of option 530 closes window 500, while Retry control 540 may be selected to retry the current transaction. Accordingly, if control 540 is selected by the administrator, process 200 is re-executed beginning at S214, with respect to the already-created collection wallet. This behavior is in contrast to conventional systems which, in response to such an error, would attempt to create a new collection wallet and then deploy a smart contract to the new collection wallet.

In another example, the error code ERROR_SIGNER is received at S224. In response, the state Upload Contract Metadata having status "started" is retrieved at S248. The status may also be changed to "error occurred" at S248. An error notification is determined at S250 based on the retrieved state and the Web3 error code. Since it may be assumed that the contract metadata has not been uploaded, the error notification may include an option to retry uploading the contract metadata.

Figure 5B:
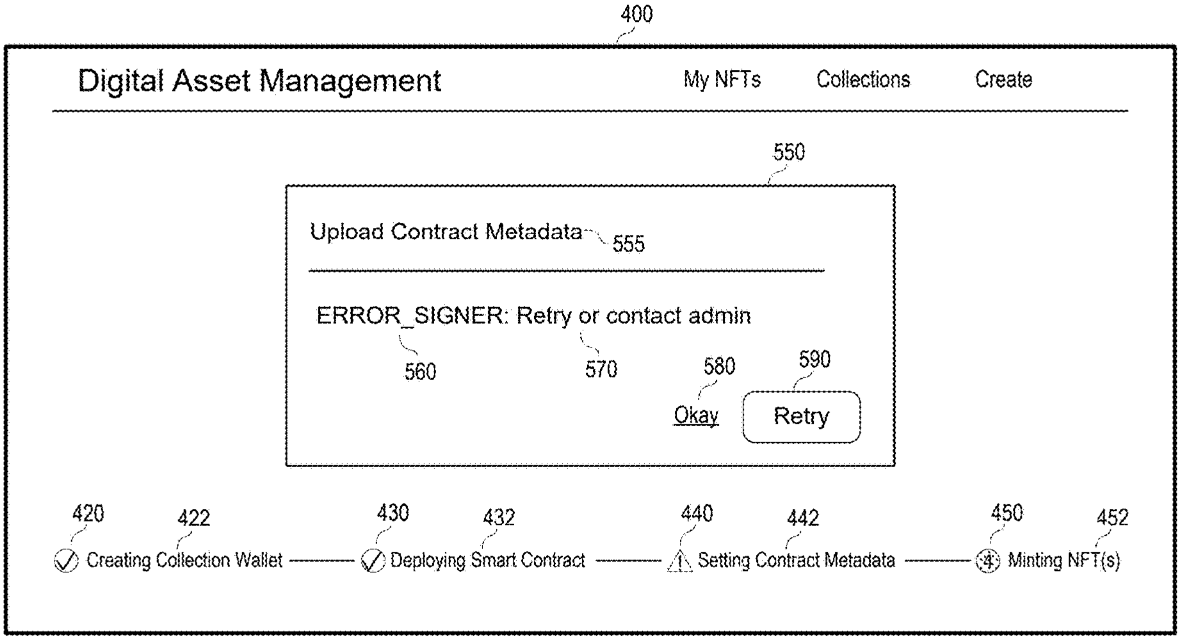

FIG. 5B shows user interface 400 presenting error notification window 550 at S252 according to some embodiments. Error notification window 550 indicates the current state 555, the returned error code 560, and remedies 570. Progress indicator 440 also indicates the occurrence of an error at the current state. Selection of option 580 closes window 500, while Retry control 590 may be selected to retry the current transaction. Selection of control 540 may therefore cause re-execution of process 200 beginning at S222 and assuming that the collection wallet has already been created and the smart contract has already been deployed.

Similarly to the above, reception of an error code at S232 causes retrieval of the state Set Contract Metadata having status "started" at S248. An error notification including an option to retry setting the contract metadata URI is determined at S250, and is presented at S252. If the option to retry is selected, process 200 is re-executed beginning at S230.

An error code received at S240 indicates that minting the collection NFT(s) has failed. An error notification which includes a retry option may be determined at S250. However, since NFTs are minted in batches as described above, one or more NFT batches may have been successfully minted before an error occurred during the minting of a next NFT batch. Accordingly, if the retry option is selected, the NFTs of the collection are ordered into new batches. Any NFT already associated with a Token ID in tenant database 132 is skipped and an instruction to mint the other NFTs is transmitted to Web3 interface server 140 at S238.

Figure 6:
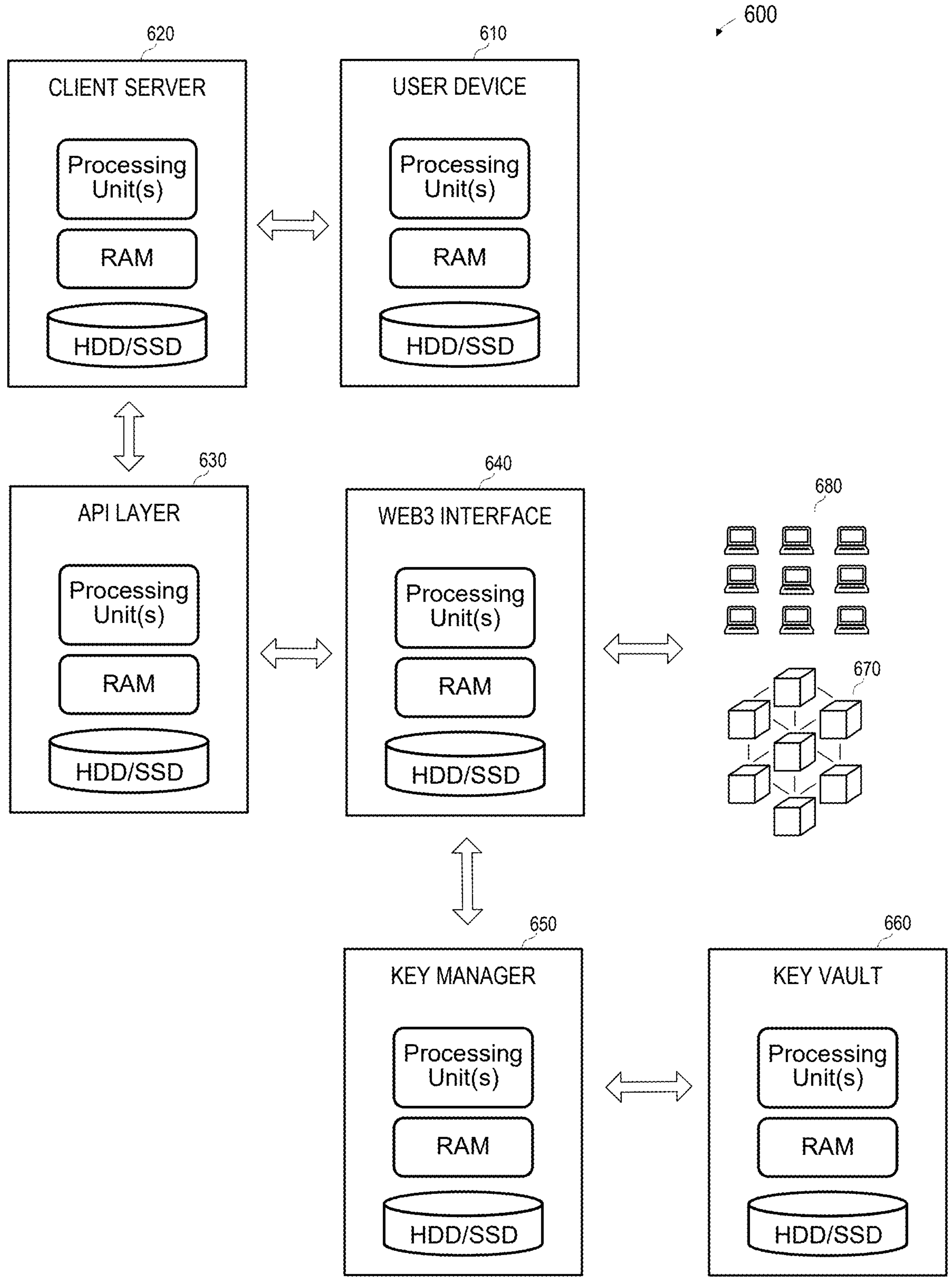
FIG. 6 is a block diagram of a system according to some embodiments.

FIG. 6 is a block diagram of cloud-based architecture 600 according to some embodiments. Client server 620, API layer 630, Web3 interface 640, and key manager 650 may comprise cloud-based compute resources, such as one or more virtual machines, allocated by a public cloud provider providing self-service and immediate provisioning, autoscaling, security, compliance and identity management features. Client server 620, API layer 630, Web3 interface 640, and key manager 650 may execute containerized applications deployed in Docker containers on Kubernetes. A user may operate user device 610 to interact with client server 620 via a Web2 paradigm. The remaining components of architecture 600, including key vault 660, may operate as described above to transmit transactions to blockchain 670 and store metadata and data of Web3 assets in decentralized storage 680.

The foregoing diagrams represent logical architectures for describing processes according to some embodiments, and actual implementations may include more, or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processor to execute program code such that the computing device operates as described herein.

Embodiments described herein are solely for the purpose of illustration. Those in the art will recognize other embodiments may be practiced with modifications and alterations to that described above.

What is claimed is:

1. A system comprising:

a memory storing executable program code; and at least one processing unit to execute the program code to cause the system to:

receive a request at a Web server to record a Web3 asset associated with data and metadata on a distributed ledger;

store the data and metadata in a database;

store a record in the database associating the Web3 asset with a first state of a recordal process, the first state associated with creating a collection keypair;

transmit a first one or more encrypted transactions to create a collection keypair associated with the Web3 asset on the distributed ledger;

receive first keys of the collection keypair;

in response to reception of the first keys:

store the first keys in the database; and modify the record in the database to associate the Web3 asset with a second state of the recordal process, the second state associated with deploying a smart contract;

transmit a second one or more encrypted transactions to deploy a smart contract associated with the Web3 asset and the collection keypair on the distributed ledger;

receive an error in response to the second one or more encrypted transactions;

in response to reception of the error:

retrieve the second state of the recordal process from the database;

determine an error notification based on the second state of the recordal process and the error, the error notification comprising an option to retry; and present the error notification;

receive a selection of the option to retry; and in response to the selection, transmit a third one or more encrypted transactions to deploy the smart contract associated with the Web3 asset and the collection keypair on the distributed ledger.

2. The system of claim 1, the at least one processing unit to execute the program code to cause the system to:

modify the record in the database to associate the Web3 asset with a third state of the recordal process, the third state associated with uploading contract metadata;

transmit a fourth one or more encrypted transactions to upload contract metadata associated with the Web3 asset and the collection keypair on the distributed ledger;

receive a second error in response to the fourth one or more encrypted transactions;

in response to reception of the second error:

retrieve the third state of the recordal process from the database;

determine a second error notification based on the third state of the recordal process and the second error, the second error notification comprising a second option to retry; and present the second error notification;

receive a second selection of the second option to retry; and in response to the second selection, transmit a fifth one or more encrypted transactions to upload contract metadata associated with the Web3 asset and the collection keypair on the distributed ledger.

3. The system of claim 2, the at least one processing unit to execute the program code to cause the system to:

modify the record in the database to associate the Web3 asset with a fourth state of the recordal process, the fourth state associated with setting a contract metadata uniform resource identifier (URI);

transmit a sixth one or more encrypted transactions to set a contract metadata URI associated with the Web3 asset and the collection keypair on the distributed ledger;

receive a third error in response to the sixth one or more encrypted transactions;

in response to reception of the third error:

retrieve the fourth state of the recordal process from the database;

determine a third error notification based on the second state of the recordal process and the third error, the third error notification comprising a third option to retry; and present the third error notification;

receive a third selection of the third option to retry; and in response to the third selection, transmit a seventh one or more encrypted transactions to set the contract metadata URI associated with the Web3 asset and the collection keypair on the distributed ledger.

4. The system of claim 3, the at least one processing unit to execute the program code to cause the system to:

modify the record in the database to associate the Web3 asset with a fifth state of the recordal process, the fifth state associated with recording a Web3 asset;

transmit an eighth one or more encrypted transactions to record the Web3 asset on the distributed ledger;

receive a fourth error in response to the eighth one or more encrypted transactions;

in response to reception of the fourth error:

retrieve the fifth state of the recordal process from the database;

determine a fourth error notification based on the fifth state of the recordal process and the fourth error, the fourth error notification comprising a fourth option to retry; and present the fourth error notification;

receive a fourth selection of the fourth option to retry; and in response to the fourth selection, transmit a ninth one or more encrypted transactions to record the Web3 asset on the distributed ledger.

5. The system of claim 4, wherein the eighth one or more encrypted transactions to record the Web3 asset on the distributed ledger are to record a plurality of Web3 assets on the distributed ledger in association with the collection keypair, and wherein transmission of the ninth one or more encrypted transactions to record the Web3 asset on the distributed ledger comprises:

determination of a first set of the plurality of Web3 assets which have been recorded on the distributed ledger in association with the collection keypair and a second set of the plurality of Web3 assets which have been not recorded on the distributed ledger in association with the collection keypair; and transmission of the ninth one or more encrypted transactions to record the second set of the plurality of Web3 assets and not the first set of the plurality of Web3 assets on the distributed ledger.

6. The system of claim 5, wherein determination of the first set of the plurality of Web3 assets which have been recorded on the distributed ledger in association with the collection keypair comprises determination of Web3 assets which are associated with a token ID in the database.

7. The system of claim 1, the at least one processing unit to execute the program code to cause the system to:

modify the record in the database to associate the Web3 asset with a fifth state of the recordal process, the fifth state associated with recording a Web3 asset;

transmit a fourth one or more encrypted transactions to record the Web3 asset on the distributed ledger;

receive a second error in response to the fourth one or more encrypted transactions;

in response to reception of the second error:

retrieve the fifth state of the recordal process from the database;

determine a second error notification based on the fifth state of the recordal process and the second error, the second error notification comprising a second option to retry; and present the second error notification;

receive a second selection of the second option to retry; and in response to the second selection, transmit a fifth one or more encrypted transactions to record the Web3 asset on the distributed ledger.

8. The system of claim 7, wherein the fourth one or more encrypted transactions to record the Web3 asset on the distributed ledger are to record a plurality of Web3 assets on the distributed ledger in association with the collection keypair, and wherein transmission of the fifth one or more encrypted transactions to record the Web3 asset on the distributed ledger comprises:

determination of a first set of the plurality of Web3 assets which have been recorded on the distributed ledger in association with the collection keypair and a second set of the plurality of Web3 assets which have been not recorded on the distributed ledger in association with the collection keypair; and transmission of the fifth one or more encrypted transactions to record the second set of the plurality of Web3 assets and not the first set of the plurality of Web3 assets on the distributed ledger.

9. The system of claim 8, wherein determination of the first set of the plurality of Web3 assets which have been recorded on the distributed ledger in association with the collection keypair comprises determination of Web3 assets which are associated with a token ID in the database.

10. One or more non-transitory media storing program code executable by at least one processing unit of a computing system to cause the computing system to:

receive a request at a Web server to record a Web3 asset on a distributed ledger;

store a record in a database associating the Web3 asset with a first state of a recordal process, the first state associated with creating a collection keypair;

transmit a first one or more encrypted transactions to create a collection keypair associated with the Web3 asset on the distributed ledger;

modify the record in the database to associate the Web3 asset with a second state of the recordal process, the second state associated with deploying a smart contract;

transmit a second one or more encrypted transactions to deploy a smart contract associated with the Web3 asset and the collection keypair on the distributed ledger;

receive an error in response to the second one or more encrypted transactions;

in response to reception of the error:

retrieve the second state of the recordal process from the database;

determine an error notification based on the second state of the recordal process and the error, the error notification comprising an option to retry; and present the error notification;

receive a selection of the option to retry; and in response to the selection, transmit a third one or more encrypted transactions to deploy the smart contract associated with the Web3 asset and the collection keypair on the distributed ledger.

11. The one or more non-transitory media of claim 10, the program code executable by at least one processing unit of a computing system to cause the computing system to:

modify the record in the database to associate the Web3 asset with a third state of the recordal process, the third state associated with uploading contract metadata;

transmit a fourth one or more encrypted transactions to upload contract metadata associated with the Web3 asset and the collection keypair on the distributed ledger;

receive a second error in response to the fourth one or more encrypted transactions;

in response to reception of the second error:

retrieve the third state of the recordal process from the database;

determine a second error notification based on the third state of the recordal process and the second error, the second error notification comprising a second option to retry; and present the second error notification;

receive a second selection of the second option to retry; and in response to the second selection, transmit a fifth one or more encrypted transactions to upload contract metadata associated with the Web3 asset and the collection keypair on the distributed ledger.

12. The one or more non-transitory media of claim 11, the program code executable by at least one processing unit of a computing system to cause the computing system to:

modify the record in the database to associate the Web3 asset with a fourth state of the recordal process, the fourth state associated with setting a contract metadata uniform resource identifier (URI);

transmit a sixth one or more encrypted transactions to set a contract metadata URI associated with the Web3 asset and the collection keypair on the distributed ledger;

receive a third error in response to the sixth one or more encrypted transactions;

in response to reception of the third error:

retrieve the fourth state of the recordal process from the database;

determine a third error notification based on the second state of the recordal process and the third error, the third error notification comprising a third option to retry; and present the third error notification;

receive a third selection of the third option to retry; and in response to the third selection, transmit a seventh one or more encrypted transactions to set the contract metadata URI associated with the Web3 asset and the collection keypair on the distributed ledger.

13. The one or more non-transitory media of claim 12, the program code executable by at least one processing unit of a computing system to cause the computing system to:

modify the record in the database to associate the Web3 asset with a fifth state of the recordal process, the fifth state associated with recording a Web3 asset;

transmit an eighth one or more encrypted transactions to record the Web3 asset on the distributed ledger;

receive a fourth error in response to the eighth one or more encrypted transactions;

in response to reception of the fourth error:

retrieve the fifth state of the recordal process from the database;

determine a fourth error notification based on the fifth state of the recordal process and the fourth error, the fourth error notification comprising a fourth option to retry; and present the fourth error notification;

receive a fourth selection of the fourth option to retry; and in response to the fourth selection, transmit a ninth one or more encrypted transactions to record the Web3 asset on the distributed ledger.

14. The one or more non-transitory media of claim 13, wherein the eighth one or more encrypted transactions to record the Web3 asset on the distributed ledger are to record a plurality of Web3 assets on the distributed ledger in association with the collection keypair, and wherein transmission of the ninth one or more encrypted transactions to record the Web3 asset on the distributed ledger comprises:

determination of a first set of the plurality of Web3 assets which have been recorded on the distributed ledger in association with the collection keypair and a second set of the plurality of Web3 assets which have been not recorded on the distributed ledger in association with the collection keypair; and transmission of the ninth one or more encrypted transactions to record the second set of the plurality of Web3 assets and not the first set of the plurality of Web3 assets on the distributed ledger.

15. The one or more non-transitory media of claim 14, wherein determination of the first set of the plurality of Web3 assets which have been recorded on the distributed ledger in association with the collection keypair comprises determination of Web3 assets which are associated with a token ID in the database.

16. The one or more non-transitory media of claim 10, the program code executable by at least one processing unit of a computing system to cause the computing system to modify the record in the database to associate the Web3 asset with a fifth state of the recordal process, the fifth state associated with recording a Web3 asset;

transmit a fourth one or more encrypted transactions to record a plurality of Web3 assets on the distributed ledger in association with the collection keypair;

receive a second error in response to the fourth one or more encrypted transactions;

in response to reception of the second error:

retrieve the fifth state of the recordal process from the database;

determine a second error notification based on the fifth state of the recordal process and the second error, the second error notification comprising a second option to retry; and present the second error notification;

receive a second selection of the second option to retry; and in response to the second selection:

determine a first set of the plurality of Web3 assets which have been recorded on the distributed ledger in association with the collection keypair and a second set of the plurality of Web3 assets which have been not recorded on the distributed ledger in association with the collection keypair; and transmit the fifth one or more encrypted transactions to record the second set of the plurality of Web3 assets and not the first set of the plurality of Web3 assets on the distributed ledger.

17. A method comprising:

receiving a request at a Web server to record a Web3 asset on a distributed ledger;

storing a record in a database associating the Web3 asset with a first state of a recordal process, the first state associated with creating a collection keypair;

transmitting a first one or more encrypted transactions to create a collection keypair associated with the Web3 asset on the distributed ledger;

modifying the record in the database to associate the Web3 asset with a second state of the recordal process, the second state associated with deploying a smart contract;

transmitting a second one or more encrypted transactions to deploy a smart contract associated with the Web3 asset and the collection keypair on the distributed ledger;

receiving an error in response to the second one or more encrypted transactions;

in response to reception of the error:

retrieving the second state of the recordal process from the database;

determining an error notification based on the second state of the recordal process and the error, the error notification comprising an option to retry; and presenting the error notification;

receiving a selection of the option to retry; and in response to the selection, transmitting a third one or more encrypted transactions to deploy the smart contract associated with the Web3 asset and the collection keypair on the distributed ledger.

18. The method of claim 17, further comprising:

modifying the record in the database to associate the Web3 asset with a third state of the recordal process, the third state associated with uploading contract metadata;

transmitting a fourth one or more encrypted transactions to upload contract metadata associated with the Web3 asset and the collection keypair on the distributed ledger;

receiving a second error in response to the fourth one or more encrypted transactions;

in response to reception of the second error:

retrieving the third state of the recordal process from the database;

determining a second error notification based on the third state of the recordal process and the second error, the second error notification comprising a second option to retry; and presenting the second error notification;

receiving a second selection of the second option to retry; and in response to the second selection, transmitting a fifth one or more encrypted transactions to upload contract metadata associated with the Web3 asset and the collection keypair on the distributed ledger.

19. The method of claim 18, further comprising:

modifying the record in the database to associate the Web3 asset with a fourth state of the recordal process, the fourth state associated with setting a contract metadata uniform resource identifier (URI);

transmitting a sixth one or more encrypted transactions to set a contract metadata URI associated with the Web3 asset and the collection keypair on the distributed ledger;

receiving a third error in response to the sixth one or more encrypted transactions;

in response to reception of the third error:

retrieving the fourth state of the recordal process from the database;

determining a third error notification based on the second state of the recordal process and the third error, the third error notification comprising a third option to retry; and presenting the third error notification;

receiving a third selection of the third option to retry; and in response to the third selection, transmitting a seventh one or more encrypted transactions to set the contract metadata URI associated with the Web3 asset and the collection keypair on the distributed ledger.

20. The method of claim 19, further comprising:

modifying the record in the database to associate the Web3 asset with a fifth state of the recordal process, the fifth state associated with recording a Web3 asset;

transmitting an eighth one or more encrypted transactions to record the Web3 asset on the distributed ledger;

receiving a fourth error in response to the eighth one or more encrypted transactions;

in response to reception of the fourth error:

retrieving the fifth state of the recordal process from the database;

determining a fourth error notification based on the fifth state of the recordal process and the fourth error, the fourth error notification comprising a fourth option to retry; and presenting the fourth error notification;

receiving a fourth selection of the fourth option to retry; and in response to the fourth selection, transmitting a ninth one or more encrypted transactions to record the Web3 asset on the distributed ledger.

* * * * *